(12) United States Patent
Shanbhogue et al.

(10) Patent No.: US 9,612,930 B2
(45) Date of Patent: Apr. 4, 2017

(54) PROVIDING AUTONOMOUS SELF-TESTING OF A PROCESSOR

(71) Applicant: Intel Corporation, Santa Clara, CA (US)

(72) Inventors: Vedvyas Shanbhogue, Austin, TX (US); Eric Rasmussen, Chelmsford, MA (US); Deep K. Buch, Folsom, CA (US); Gordon McFadden, Hillsboro, OR (US); Kameswar Subramaniam, Austin, TX (US); Amy L. Santoni, Scottsdale, AZ (US); Willard M. Wiseman, Tigard, OR (US); Bret L. Toll, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 14/737,768

(22) Filed: Jun. 12, 2015

(65) Prior Publication Data

US 2016/0364308 A1    Dec. 15, 2016

(51) Int. Cl.
| | | |
|---|---|---|
| *G06F 11/00* | (2006.01) | |
| *G06F 11/263* | (2006.01) | |
| *G06F 11/22* | (2006.01) | |
| *G06F 11/14* | (2006.01) | |

(52) U.S. Cl.
CPC ...... *G06F 11/2635* (2013.01); *G06F 11/2242* (2013.01); *G06F 11/2268* (2013.01); *G06F 11/1417* (2013.01); *G06F 11/1433* (2013.01)

(58) Field of Classification Search
CPC ............ G06F 11/1433; G06F 11/1417; G06F 11/2242; G06F 11/2635
See application file for complete search history.

(56) References Cited

U.S. PATENT DOCUMENTS

| | | | |
|---|---|---|---|
| 6,594,756 B1* | 7/2003 | Moran | G06F 15/177 713/1 |
| 8,806,104 B2 | 8/2014 | Shanbhogue et al. | |
| 8,924,741 B2 | 12/2014 | Wolrich et al. | |
| 2008/0022108 A1* | 1/2008 | Brannock | G06F 21/10 713/176 |
| 2010/0325481 A1* | 12/2010 | Dahan | G06F 11/2025 714/10 |

* cited by examiner

*Primary Examiner* — Charles Ehne
(74) *Attorney, Agent, or Firm* — Trop, Pruner & Hu, P.C.

(57) ABSTRACT

In an embodiment, a processor includes at least one core, a power management unit having a first test register including a first field to store a test patch identifier associated with a test patch and a second field to store a test mode indicator to request a core functionality test, and a microcode storage to store microcode to be executed by the at least one core. Responsive to the test patch identifier, the microcode may access a firmware interface table and obtain the test patch from a non-volatile storage according to an address obtained from the firmware interface table. Other embodiments are described and claimed.

23 Claims, 10 Drawing Sheets

PROVIDING AUTONOMOUS SELF-TESTING OF A PROCESSOR

TECHNICAL FIELD

Embodiments relate to processors and testing techniques.

BACKGROUND

Many computer systems provide a variety of test facilities to ensure reliability availability and serviceability (RAS). Some of these tests provide for testing of arrays within a processor, while other tests are designed to test functional operation of the processor. In some processors, a dedicated validation unit is provided to perform such testing; however, the inclusion of such additional dedicated logic increases costs and complexity.

DETAILED DESCRIPTION

Embodiments provide autonomous system analytics (ASA) technology to perform self-testing of a processor and its functionality with reduced overhead. Such testing can be used to provide error predictive capabilities to minimize unplanned downtime and in-field diagnostics to improve manufacturing bring up and quicker system failure debug.

Although the scope of the present invention is not limited in this regard, embodiments provide ASA features to enable multiple types of in-field testing content, including testing for arrays and non-arrays of a processor and its constituent logic. For programmable built-in self-test (PBIST) accessible arrays, manufacturing array test algorithms performed during high volume manufacturing (HVM) testing may be re-used to test the arrays. For non-arrays, test content may be provided to run on processor cores and/or other processing engines to target speed paths and specific functionality. While performing these functional tests and array testing, embodiments may perform voltage and frequency margining to predict failures.

Embodiments provide a test micro-architecture that is built around a microcode patch applied at reset through a firmware interface table (FIT) mechanism. This micro-architecture allows functional requirements of ASA to be met while ensuring security properties to ensure that trusted execution environments such as implemented using Intel® Software Guard Extensions (SGX) technology, Intel® Trusted Execution Technology (TXT) technology, secure enclaves or an ARM TrustZone, among others, are not violated.

In an embodiment, this microcode patch can be applied at reset to perform the core array tests. At the same time, while such testing is being performed, techniques are provided to prevent untrusted entities like a manageability engine (ME) of the processor from being able to compromise the execution environment in which the microcode patch or secure boot authenticated code modules are being executed. In addition, embodiments may protect secrets like secure enclave keys, residual secrets left in caches and register files by secure enclaves (and user secrets) from being compromised. By containing the complexity of performing core array tests to a microcode patch, the internal details of the core arrays and test requirements/restrictions are not exposed to external entities like the manageability engine.

As such, embodiments may perform the testing described herein without an additional dedicated microcontroller to act as a trusted agent to expose an application programming interface (API) for the manageability engine to perform the tests. In this way, reduced costs are realized by not providing an additional microcontroller in the socket.

Figure 1:
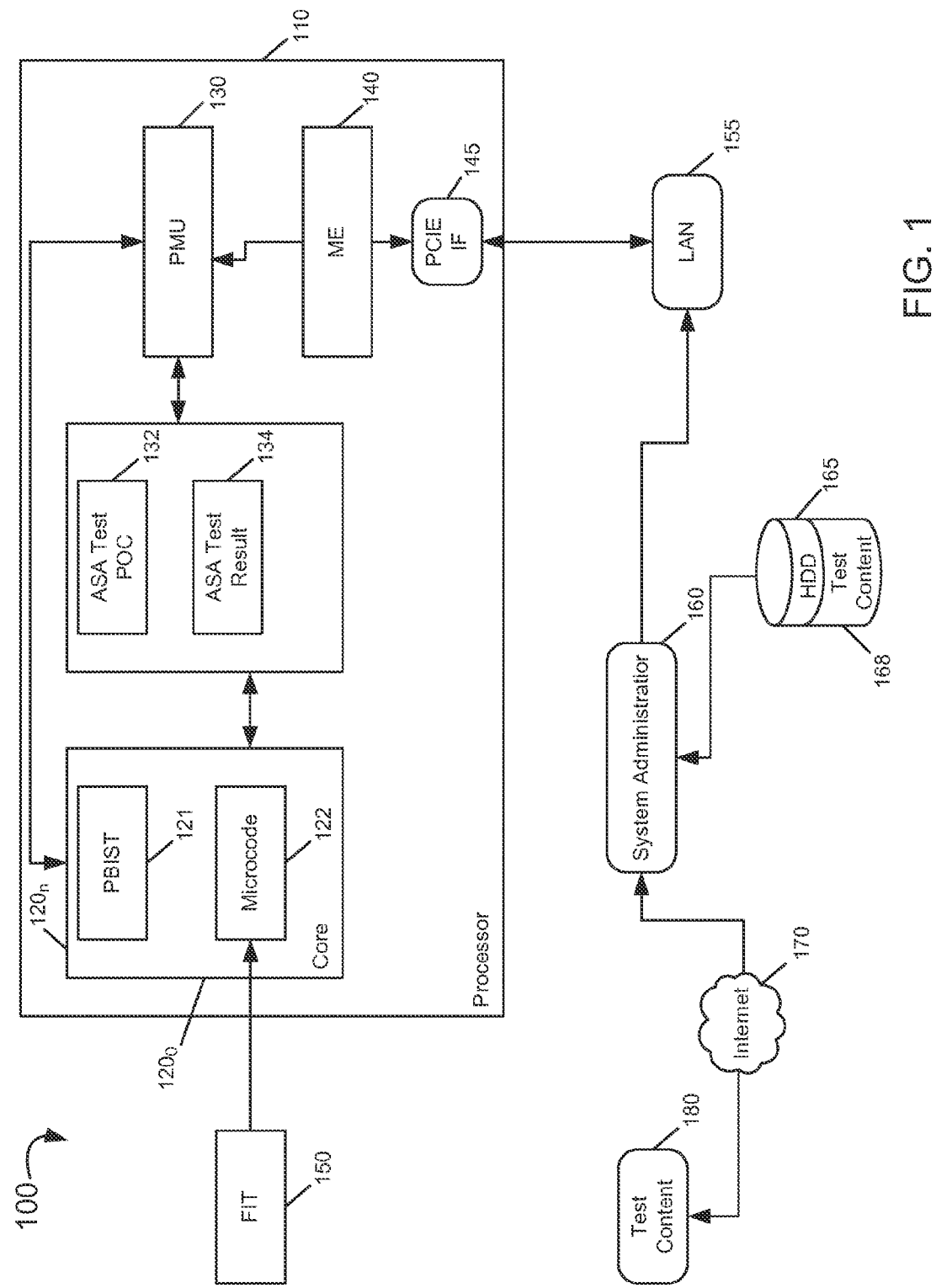
FIG. 1 is a block diagram of a computing environment in accordance with an embodiment of the present invention.

Referring now to FIG. 1, shown is a block diagram of a computing environment in accordance with an embodiment of the present invention. As shown in FIG. 1, computing environment 100 may be any type of computing environment, from a standalone system to a set of interconnected computer systems coupled together in a given network configuration. More specifically, environment 100 includes components of a local computer system, along with remote components coupled thereto. In some cases, the local computer system may correspond to a server computer system of a datacenter that is arranged for high availability. In other cases, the local computer system may be a standalone computer system of a given user, e.g., a desktop, laptop or even mobile computer (such as a tablet computer or smartphone). In any case, the local system may be configured to perform autonomous self-testing throughout its life to maintain a high availability system with reliability, availability and serviceability (RAS).

As seen, environment 100 includes a processor 110 of the local computer system. In an embodiment, processor 110 may be a multi-core or many-core processor or other system-on-chip (SoC). As illustrated, processor 110 includes a plurality of cores $120_0$-$120_n$. As will be described herein, each core may be configured to execute microcode that may perform at least some of the self-testing described herein. To this end, each core 120 may be configured with a microcode storage 122 and a self-test unit 121 that may be configured to perform self-testing. In different embodiments, understand that the various self-testing described herein can be performed by microcode to be executed on one or more cores or other processing engines of the processor.

Still with reference to FIG. 1, cores 120 couple to a power management unit (PMU) 130 which may be implemented, in an embodiment, as a microcontroller (including or coupled to a non-transitory storage medium to store instructions to perform a variety of different operations) to perform power management activities for the processor, in addition to performing autonomous self-testing described herein. PMU 130 may include various test registers, including a first test register 132 and a second test register 134. Although for ease of illustration these registers are shown as being external to PMU 130, understand that in many embodiments these test registers may be located within the PMU itself.

As will be discussed herein, access to these registers may be made via microcode 122. In addition, access may also be performed by way of a manageability engine (ME) 140, which may perform management and related security operations within processor 110. As seen, ME 140 couples to an interface 145, which in an embodiment is a Peripheral Component Interconnect Express (PCIe™) interface to provide interconnection to a local area network (LAN) 155.

For example, in a datacenter implementation, LAN 155 may provide access to the local computer system by a system administrator 160, which may be implemented as one or more other server computers of the datacenter. In this way, test content 168, e.g., stored in a disk storage 165 may be provided by system administrator 160 for execution in the local computer system. In addition, other test content 180 may be provided by way of an Internet-based network 170. In different embodiments, this test content may include diagnostic programs to be executed on the processor to target speed paths and specific functional units in the processor and/or the microcode patch to be applied as described herein to test the core arrays.

In an embodiment, a manageability engine and microcode may access one or more test registers (referred to generally as ASA registers) as described herein to request tests to be carried out on reset and to gather the results of the test. The PMU exposes a set of services over an in-band peripheral environmental control interface (PECI) to access these registers and to select voltage and frequency operating points, in an embodiment.

In an embodiment, a first control register can be accessed by microcode using a IO transaction using a control register address. In an embodiment, this first test register may take the form shown in Table 1.

TABLE 1

| Name | Bit List | Access Type | Reset Type | Reset Value | Bit Name | Description |
|---|---|---|---|---|---|---|
| ASA_TEST_POC | [3:0] | RWS | PWRGD | 0 | ASA_PATCH_ID | 0000 : No ASA Test patch requested 0001 to 1110: ID of ASA test patch 1111 : No ASA Test patch requested. Core requested to enter infinite loop at reset to allow ME to perform uncore tests |
| | [28:4] | Z | RESET | | RSVD | Reserved |
| | [29] | RWS | PWRGD | | ASA_IA_TEST_MODE | ME sets this bit to indicate it is requesting core functional ASA tests to be run on this socket. |
| | [30] | RW | RESET | | RSVD | Reserved |
| | [31] | RW | | | RUN | When set to 1 indicates that the ASA test patch to start the core array tests |

In an embodiment, the ASA_PATCH_ID and ASA_IA_TEST_MODE fields are sticky and only cleared on a cold reset. The rest of the bits in the register may be cleared on all resets. The manageability engine may access this register using PCS_READ/PCS_WRITE requests over the PECI mailbox with the below restrictions, in an embodiment: allowed to read and write the ASA_PATCH_ID; prevented from writing a value of '0000' to ASA_PATCH_ID; allowed to read ASA_IA_TEST_MODE and RUN bits in the register; allowed to set ASA_IA_TEST_MODE to 1 but not clear it; and allowed to write RUN bit in the register.

In an embodiment a second control register can be accessed by microcode using the same addressing mechanism. Microcode and the PMU are allowed to read and write this register. The manageability engine can read, but not write to this register, in an embodiment.

TABLE 2

| Name | Bit List | Access Type | Reset Type | Reset Value | Bit Name | Description |
|---|---|---|---|---|---|---|
| ASA_TEST_RESULT | [15:0] | RW | RESET | 0 | FAIL_COUNT | Count of cores that failed the array tests |
| | [31:16] | RW | RESET | 0 | PASS_COUNT | Count of cores that passed the array tests |
| | [47:32] | RW | RESET | 0 | FIRST_FAILED_CORE | ID of the first core that increments the FAIL_COUNT. If multiple cores failed array tests then the first core to increment the FAIL_COUNT will record its core ID in this field. |
| | [62:48] | RW | RESET | 0 | FAILURE_INFO | Additional information to qualify the array tests that failed. If multiple cores failed array tests then the first core to increment the FAIL_COUNT will record some additional information here to qualify the failure. |
| | 63 | RW | RESET | 0 | SAFE_MODE_ACTIVE | If set, indicates that microcode has reached a safe point after completing the ASA test patch load, if applicable |

Figure 2:
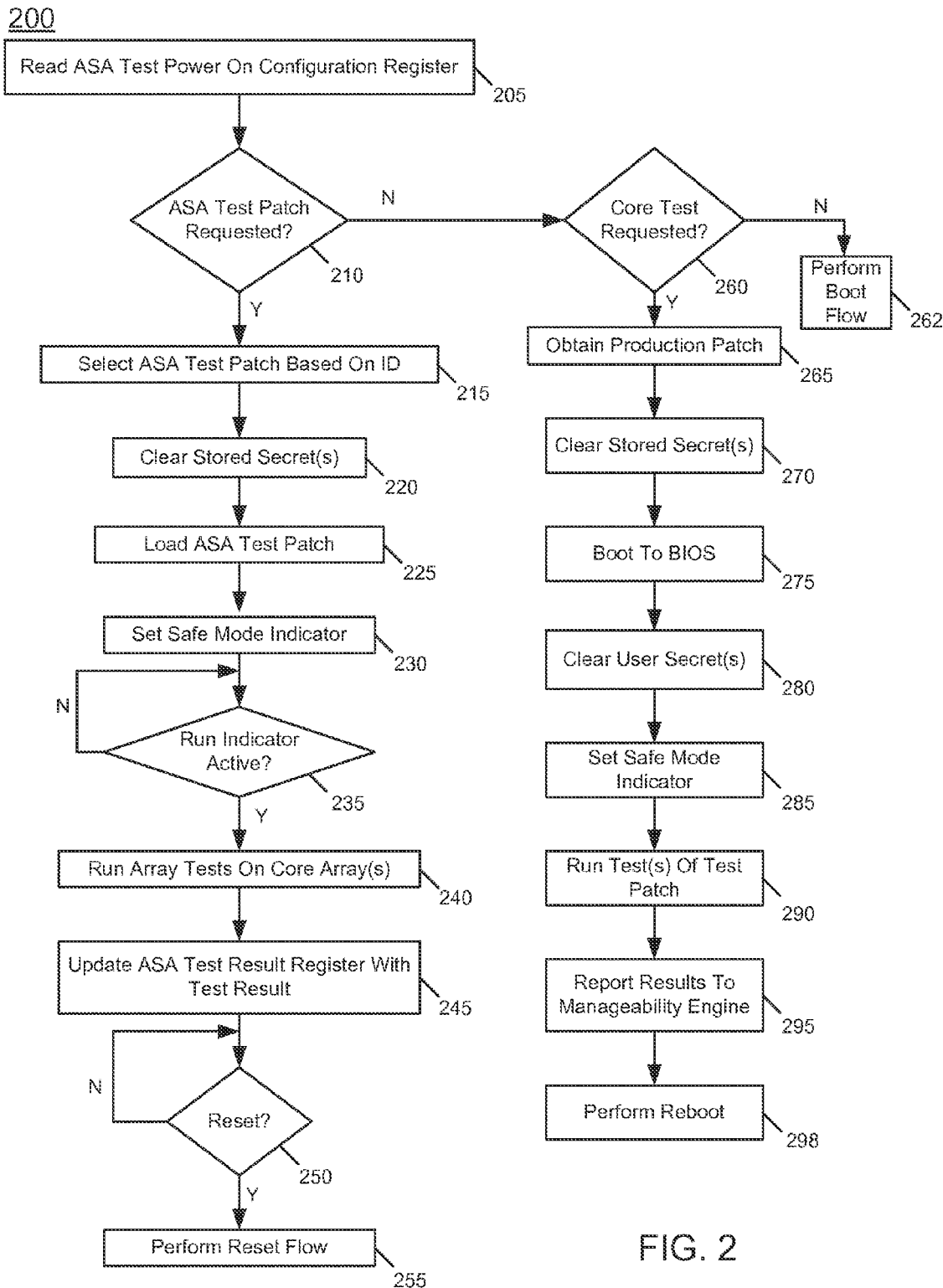
FIG. 2 is a flow diagram of a method for performing autonomous self-testing of a processor in accordance with an embodiment of the present invention.

Referring now to FIG. 2, shown is a flow diagram of a method for performing autonomous self-testing of a processor in accordance with an embodiment. In the embodiment of FIG. 2, method 200 may be performed by various combinations of hardware, software, and/or firmware. To this end, some operations of method 200 may be performed by execution of microcode on one or more cores of a processor, while other operations may be performed by one or more of a PMU and ME of the processor.

As illustrated, method 200 begins by reading an ASA test power on configuration register (block 205). In an embodiment, microcode may be configured to perform this read operation on reset of the processor. Based on information in this configuration register it is determined whether an ASA test patch is requested (diamond 210). If so, the microcode may select a given test patch based on the ID (block 215). To this end, a test patch ID obtained from the configuration register may be used to access a firmware interface table (FIT) to determine and obtain an appropriate test patch. At block 220 various stored secrets, e.g., associated with a trusted execution environment and/or user-based secrets may be cleared. Thereafter, the ASA test patch can be loaded (e.g., into microcode storage 122 of FIG. 1) (block 225).

Thereafter, the microcode may set a safe mode indicator (block 230), which may be an indicator within the ASA test result register to indicate that the processor is in a safe mode (realized such as by clearing of the secrets). Next it can be determined whether a run indicator, present in the ASA test power on configuration register, is active (diamond 235). As will be discussed, in an embodiment the ME may set this indicator.

Still with reference to FIG. 2, when it is determined that this run indicator is active, control passes to block 240 where one or more array tests may be run on arrays of the core. Note that these array tests may write strings of predetermined values (e.g., zeros and ones) into various arrays of the core, such as one or more cache memories of the core and processor. By writing predetermined values in given orders (e.g., horizontally and vertically within lines of the cache memory), it can be determined whether any faults are present in the cache memory. In one embodiment, the microcode may employ PBIST engine 121 to perform these tests by programming the PBIST engine with a test vector and waiting for the results of testing from the PBIST engine. Based on the results of such testing, the microcode may (at block 245) update the ASA test result register with the test result for the particular core. In one embodiment, when the microcode utilizes the PBIST engine, the microcode may read the status of the tests from the PBIST engine. In an embodiment, this test result may be a simple indication of pass or fail. In some cases the fail indication may further provide information regarding the failure, such as particular locations within one or more cache memories at which a failure occurred. Thereafter, it can be determined whether the processor has been reset (diamond 250). On reset, a reset flow is performed (block 255). Thus at this point, the ASA testing is completed and normal operations may begin.

Still with reference to FIG. 2, if at diamond 215 it is determined that no ASA test patch is requested, control next passes to diamond 260 to determine whether a core test is requested. In an embodiment, this determination may be based on another indicator within the power on configuration register. If no such core test is requested, control passes to block 262 where a normal reset flow may be performed to enable the processor to boot into a normal operating mode.

Instead if a core test is requested, control passes to block 265 where a production patch may be obtained. Next, control passes to block 270 where any stored secrets may be cleared, as discussed above. Thereafter at block 275 a boot to BIOS occurs and any user secrets can next be cleared by BIOS or other firmware/software invoked by BIOS (block 280).

At this point the BIOS may request microcode to set a safe mode indicator (block 285). In an embodiment, the BIOS may set this safe mode indicator present in the ASA result register to indicate that the processor is in a safe mode. Subsequent to setting the safe mode indicator, the BIOS may request the ME for the test programs to be executed on the core and in response the ME provides the test content to the BIOS. As such, BIOS may execute the tests of the test content provided by the ME (block 290). Subsequently the BIOS waits for the RUN indicator to be set by the ME. At the conclusion of such tests, the results can be reported to the ME (block 295). Thereafter, at block 298, a reboot may occur so that normal processor operation may continue or begin. Understand while shown at this high level in the embodiment of FIG. 2, understand many variations and alternatives are possible.

Figure 3:
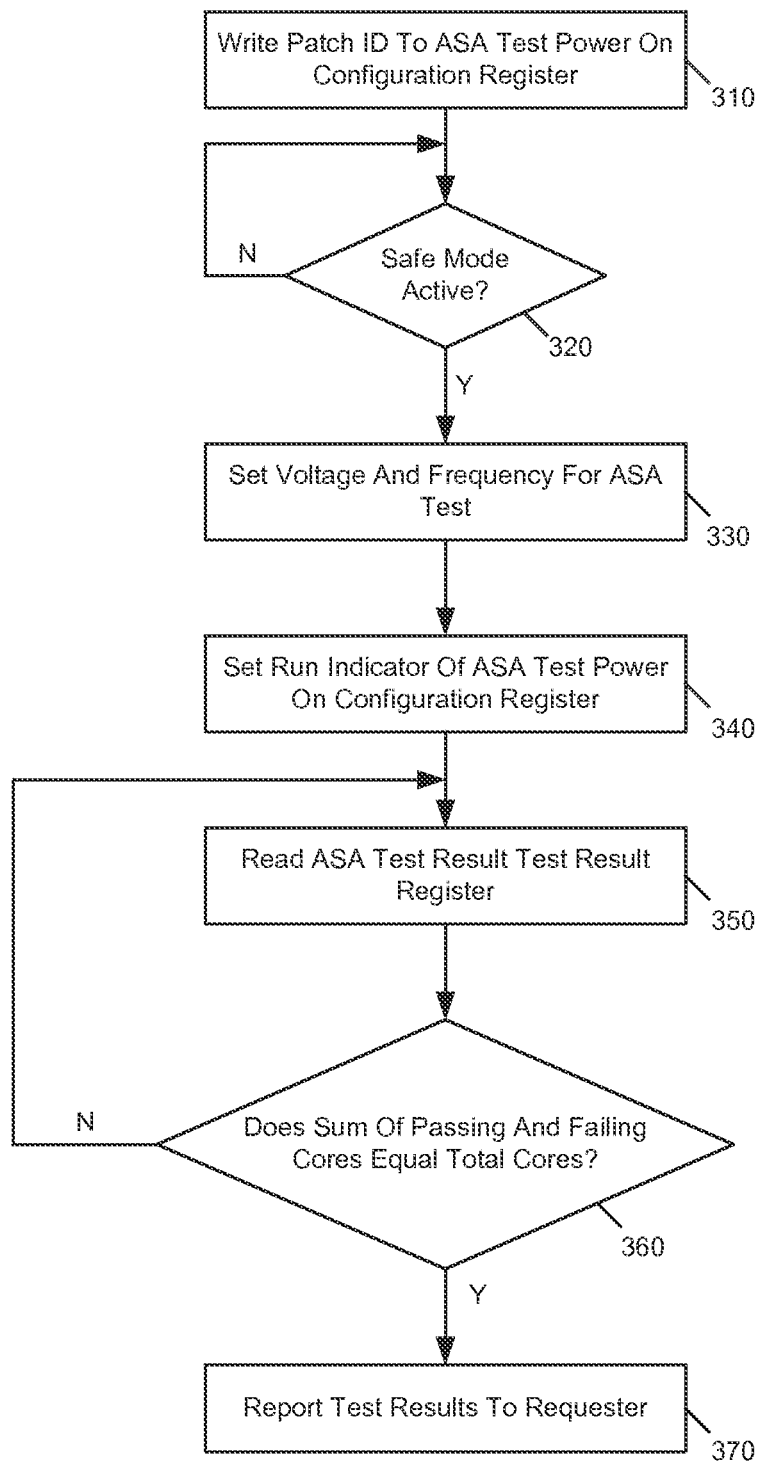
FIG. 3 is a flow diagram of an autonomous self-testing method in accordance with another embodiment.

Referring now to FIG. 3, shown is a flow diagram of an overall autonomous testing method in accordance with an embodiment of the present invention. In an embodiment, method 300 may be performed by a manageability engine or other hardware control logic configured to implement autonomous self-testing, e.g., as directed by a remote entity, such as a system administrator or other management logic. As seen, method 300 begins by writing a patch ID to the ASA test power on configuration register (block 310). In an embodiment, this test patch ID may be an indicator of a desired core array test to be performed that is stored in firmware associated with the computer system to be autonomously tested (or an indication of a given functional test to be performed by way of a predetermined value in the patch ID field and an active core test field of the configuration register). Next it is determined whether a safe mode is active (diamond 320). This determination may be based, e.g., on a safe mode indicator present within the ASA test result register.

Thereafter, at block 330 a voltage and frequency for the ASA test may be set. In an embodiment, the manageability engine may instruct a PMU or other power controller to set a particular voltage and frequency for the core to undergo testing to enable voltage and frequency margining to be performed, e.g., to determine whether a particular test routine is validly executed at a given voltage and frequency level. In this way, relative aging of the processor can be determined, such that a good measure of error prediction and/or failure can be identified.

Still with reference to FIG. 3, at block 340 a run indicator of the ASA test power on configuration register may be set to indicate that the test is ready to be performed. Thus at this point, one or more desired tests present in the test code may be executed.

Information regarding test results may be communicated and provided to the ME, which may update an ASA test result register based on the results. In an embodiment, each of multiple cores of a processor can be tested in this way, and counts may be maintained within this test register of the number of passing cores and failing cores. That is, to enable test results to be communicated and analyzed while minimizing the area consumption for such additional registers, minimal test result information by way of counts of passing and failing cores (and an identifier of at least the first failing core) may be maintained. Still further, in some embodiments an identifier of the first core that failed may also be stored in the test result register. Understand that in other cases, instead of such minimal amount of storage, greater result storage may be provided such that specific test results for each individual core can be provided.

Thus as illustrated based on the results obtained from reading the test result register (block 350), it can be determined whether the sum of the passing and failing cores equals the total number of cores present in the processor (diamond 360). If so, the testing has acceptably concluded and control passes to block 370 where the test results can be reported to a requester, e.g., a system administrator or other remote entity (or to a local user). Understand while described above at this high level in the embodiment of FIG. 3, many variations and alternatives are possible.

In an embodiment, the PMU provides PECI control services (PCS) services to the ME to perform ASA tests (e.g., voltage/frequency margining) These and other PCS services for ASA functionality may be provided only if a SAFE_MODE_ACTIVE indicator is enabled in the second test register. If the SAFE_MODE_ACTIVE indicator is 0 then only the PCS services to read or ASA_TEST_POC and ASA_TEST_RESULT register are provided and all other ASA-related PCS requests may be denied with a suitable error code.

In order to perform core array tests, one or more microcode patches (ASA_TEST_PATCH) may be provided to implement a test sequence to perform core array tests. In some cases, these test sequences may be spread across multiple patches due to microcode resource restrictions. The ASA_TEST_PATCH can be differentiated from other production patches via a field in the microcode patch header—ASA_ID—which in an embodiment, is a 4-bit field. On production patches, the ASA_ID is set to 0000b. The ASA_TEST_PATCH is a signed microcode patch with a non-zero value in the ASA_ID of the microcode patch header. The field thus allows for up to 15 unique ASA test patches for a given core product. Embodiments may allow these patches to only be applied at reset through the FIT.

In an embodiment, one or more of these ASA_TEST_PATCHES can be stored in a non-volatile storage such as a flash storage that stores a platform BIOS. In turn, BIOS may link these test patches to a FIT as patch type entries (type 0x01). The manageability engine can use the ASA_TEST_POC register to request core microcode to load given ASA test patches linked to the FIT at reset.

The ASA_TEST_POC register is sampled by the reset microcode on all threads as part of their reset microcode execution if ASA is fuse enabled on a given processor. If the ASA_TEST_POC register is non-zero (where a non-zero value is programmed into ASA_PATCH_ID or ASA_IA_TEST_MODE fields by the ME), the reset microcode clears any secure secrets in the thread (such as secrets of a trusted execution environment, e.g., keys, secrets in caches, etc.) and places the thread in debug mode.

The reset microcode uses the value of the ASA_TEST_POC.ASA_PATCH_ID as one of the inputs to the algorithm it uses to select the reset microcode patch to apply. The FIT parsing, in an embodiment, uses family, model, stepping and platform ID to match against patches linked to the FIT to determine if the patch is an appropriate patch. Among the patches that match the family, model, stepping and platform ID, microcode selects the patch having the highest update version. This matching can be extended to match the ASA_TEST_POC.ASA_PATCH_ID to the ASA_ID in the patch header as part of the patch. Thus when the ASA_TEST_POC.ASA_PATCH_ID is non-zero, this loop will select the highest ASA_TEST_PATCH that matches the family, mode, stepping, platform ID and ASA_TEST_POC.ASA_PATCH_ID.

If the ASA_TEST_POC.ASA_PATCH_ID is not zero, then following the patch@reset flow the reset microcode on all cores rendezvous. Once all the cores rendezvous, the bootstrap processor (BSP) thread generates a poison cycle if LaGrande Technology (LT), also known as Intel® Trusted Execution Technology (TXT), is enabled in the platform. Following generation of the LT poison cycle, microcode sets the ASA_TEST_RESULT.SAFE_MODE_ACTIVE to 1 to indicate that the ASA patching is complete. If an ASA_TEST_PATCH was not applied due to the patch not being found in the FIT or any failures in application of the patch, then the reset microcode enters an infinite loop waiting for a reset. In an embodiment, writing 1 to SAFE_MODE_ACTIVE bit will cause generation of a LT poison cycle to disable a subsequent TXT launch and AC mode entry. Subsequent to generation of the LT poison cycle, the SAFE_MODE_ACTIVE bit may be set in the ASA_TEST_RESULT register.

If an ASA_TEST_PATCH was successfully applied then the reset invokes the ASA test sequence that is patched in by this patch. The ASA test sequence polls on ASA_TEST_POC.RUN bit to be set to 1 for the ME to indicate that the array tests are ready to be run. When the ASA_TEST_POC.RUN bit is set to 1, the ASA test sequence uses the PBIST and/or local direct array testing to implement the array tests on one or more arrays in the core. The result of that testing is recorded in the ASA_TEST_RESULT register, e.g., by incrementing the pass or fail count of the ASA_TEST_RESULT register. In one embodiment, the ASA_TEST_RESULT register is a shared resource by all cores in a socket. In such an embodiment, updates to this register can be protected using an uncore semaphore operation. In an embodiment, the first core that increments the fail counter in this register may record its ID and information in the ASA_TEST_RESULT register. Subsequent to completion of testing, the patch enters an infinite loop waiting for a reset with all events disabled.

If the ASA_TEST_POC.PATCH_ID is non-zero, the core will not execute any (non-test) instructions in a given boot cycle. If ASA_TEST_POC is not zero then following the patch@reset flow, the reset microcode does not perform a SGX key derivation.

If ASA_TEST_POC.PATCH_ID is zero, then the reset microcode continues the reset flow normally, including launching any ACM linked to the FIT (e.g., LT-SX or AnC startup ACM). Note that the SAFE_MODE_ACTIVE is still 0 even when ASA_IA_TEST_MODE is 1. This allows software like the SCLEAN ACM and BIOS/initial boot block (IBB) to execute with a good execution environment and clear any user secrets in the platform. The BIOS/IBB may set the SAFE_MODE_ACTIVE when it is ready, using a MSR interface to initiate the ASA functional tests to place the part into ASA test mode such that ME can initiate voltage/frequency appropriate for running the ASA tests. Setting of the SAFE_MODE_ACTIVE also leads to generation of a LT poison cycle on the platform.

The below pseudo-code of Table 3 illustrates an example reset microcode flow and ASA patching sequence in accordance with an embodiment.

TABLE 3

```
warm/cold_reset_microcode:
Scrub I$, D$, L2$, register files, etc. that may contain residual secrets
...
IF ASA_FUSE_ENABLED
    ASA_TEST_POC_TMP = port-in (ASA_TEST_POC_VCR_ADDR)
ELSE
    ASA_TEST_POC_TMP = 0
ENDIF
IF ASA_TEST_POC_TMP != 0
    Clear secrets // Clear any SGX fuse and/or derived keys
ENDIF
IF FIT_PATCH_ENABLED
    find_fit_patch(family, model, stepping,
      platform_id, ASA_TEST_POC_TMP.ASA_PATCH_ID)
    IF FIT patch found
        Apply patch // This may be the ASA_TEST_PATCH
    ENDIF
ENDIF
...
IF ASA_TEST_POC_TMP.ASA_PATCH_ID != 0
    // Rendezvous all cores. This need not be a new rendezvous
    // but could be folded into the existing rendezvous at end
    // of patch@reset processing in reset flow
    Increment uncore join counter
    WHILE (uncore join counter != resolved_core_count);
    IF BSP
        IF LT_PLATFORM_DIS == 0 // LT disable fuse
            Send_LT_poison( )
        ENDIF
        Acquire uncore semaphore
        // Indicate SAFE_MODE active if ASA patches requested or
        // ASA IA test mode requested
```

TABLE 3-continued

```
    TMP = Port-in (ASA_TEST_RESULT_VCR_ADDR)
    TMP |= SAFE_MODE_ACTIVE_BIT
    Port-out (ASA_TEST_RESULT_VCR_ADDR, TMP)
    Release uncore semaphore
  ENDIF
  // If a ASA test patch was applied it will replace
  // below jump to the ASA test sequence else this
  // jump by default goes to an infinite loop waiting for
  // reset. So from here we will either invoke the ASA test sequence
  // if a ASA_TEST_PATCH was applied or enter infinite loop waiting
  // for reset with all events disabled
  Goto asa_test_sequence_or_infinite_loop
  Infinite_loop:
      // Ensure all events disabled
      While(1);
ENDIF
IF ASA_TEST_POC_TMP != 0
  Goto past_sgx_key_derivation
ENDIF
// SGX Key derivation on cold reset
...
Past_sgx_key_derivation:
...
// Load any FIT ACMS if enabled
...
IF BSP
  Goto INIT_processing
ELSE
  Goto WFS_State
ENDIF
```

Table 4 below provides example pseudo-code of an ASA test sequence in accordance with an embodiment.

TABLE 4

```
WHILE ASA_TEST_POC_TMP.RUN == 0
  ASA_TEST_POC_TMP = port-in
(ASA_TEST_POC_VCR_ADDR)
ENDWHILE
...
// Perform array tests on core arrays
// Multiple arrays may be tested by the patch
// If any array tests then stop and go to record_result
...
Record_result:
// All array tests completed
Acquire uncore semaphore
ASA_TEST_RESULTS_TMP = port-in
(ASA_TEST_RESULTS_VCR_ADDR)
If any array test failed
  ASA_TEST_RESULTS_TMP.FAIL_COUNT += 1
  IF ASA_TEST_RESULTS_TMP.FAIL_COUNT == 1
    ASA_TEST_RESULTS_TMP.FIRST_FAILED_CORE=
    SELF_CORE_ID
ASA_TEST_RESULTS_TMP.FAILURE_INFO = <additional failure info>
  ENDIF
Else
  ASA_TEST_RESULTS_TMP.PASS_COUNT += 1
Endif
port-out (ASA_TEST_RESULTS_TMP,
ASA_TEST_RESULTS_VCR_ADDR)
Release uncore semaphore
// Enter infinite loop waiting for a reset with all events disabled
WHILE (1)
```

Thus in various embodiments, a microcode patch applied at reset can be used to perform core array tests. In addition, using a power on configuration to specify when intrusive tests will be conducted enables a safe mode to be activated to carry out these tests.

In an embodiment, an indicator may be provided in a MSR_PLATFORM_INFO register to indicate availability of ASA capability on the platform by reflecting the state of an ASA fuse. In an embodiment, the ASA_TEST_POC is exposed through a model specific package scoped read-only MSR. A write to this MSR by software may lead to a general protection fault (#GP). In an embodiment, the ACTIVATE_ASA_SAFE_MODE is a model specific package scoped MSR, in which a given bit, e.g., can be written to 1, to set the SAFE_MODE_ACTIVE in ASA_TEST_RESULT register. All other bits in this MSR are reserved.

The read of this MSR returns the state of the SAFE_MODE_ACTIVE bit in the ASA_TEST_RESULT register. This bit is sticky and cannot be cleared once set to 1, and writing 0 to the SAFE_MODE_ACTIVE bit will be ignored, in an embodiment. In an embodiment, writing to this MSR will cause a #GP if: ASA is not fuse enabled; reserved bits are set; ASA_IA_TEST_MODE is 0 in ASA_TEST_POC; the product is post-SENTER.

Understand that embodiments can be used in many different types of systems. One particular use case for performing autonomous self-testing as described herein is in the context of an SoC or other processor that is part of an embedded system. As an example, the processor may be embedded within a sensing module, calculation module or so forth that is a standalone system within a larger system, such as a vehicle sensing unit that is part of a larger vehicle electronic system. Another such use case may be for autonomous self-testing of an SoC or other processor of and Internet of things (IOT) device that may be implemented as part of a larger system, such as an industrial system, consumer appliance or so forth.

To that end, embodiments may perform the autonomous self-testing described herein on reset, as well as responsive to an incoming request for such self-testing, e.g., from a remote entity such as a system administrator, a vehicle service center or other maintenance service that can perform remote monitoring and diagnostics of a system. As such, the autonomous-self testing may be performed to determine a measure of reliability of the processor and/or to make error predictions. For example, in some cases based on voltage and frequency margining performed during testing, an error prediction value can be determined that in turn may be compared to an allowed error prediction level. If the determined value varies from this allowed level by at least a threshold amount, error prediction information may be communicated to a remote entity, such as a main system of which an embedded system is a part, and/or to a remote entity. Of course many other use cases for the autonomous self-testing described herein are possible.

Figure 4:
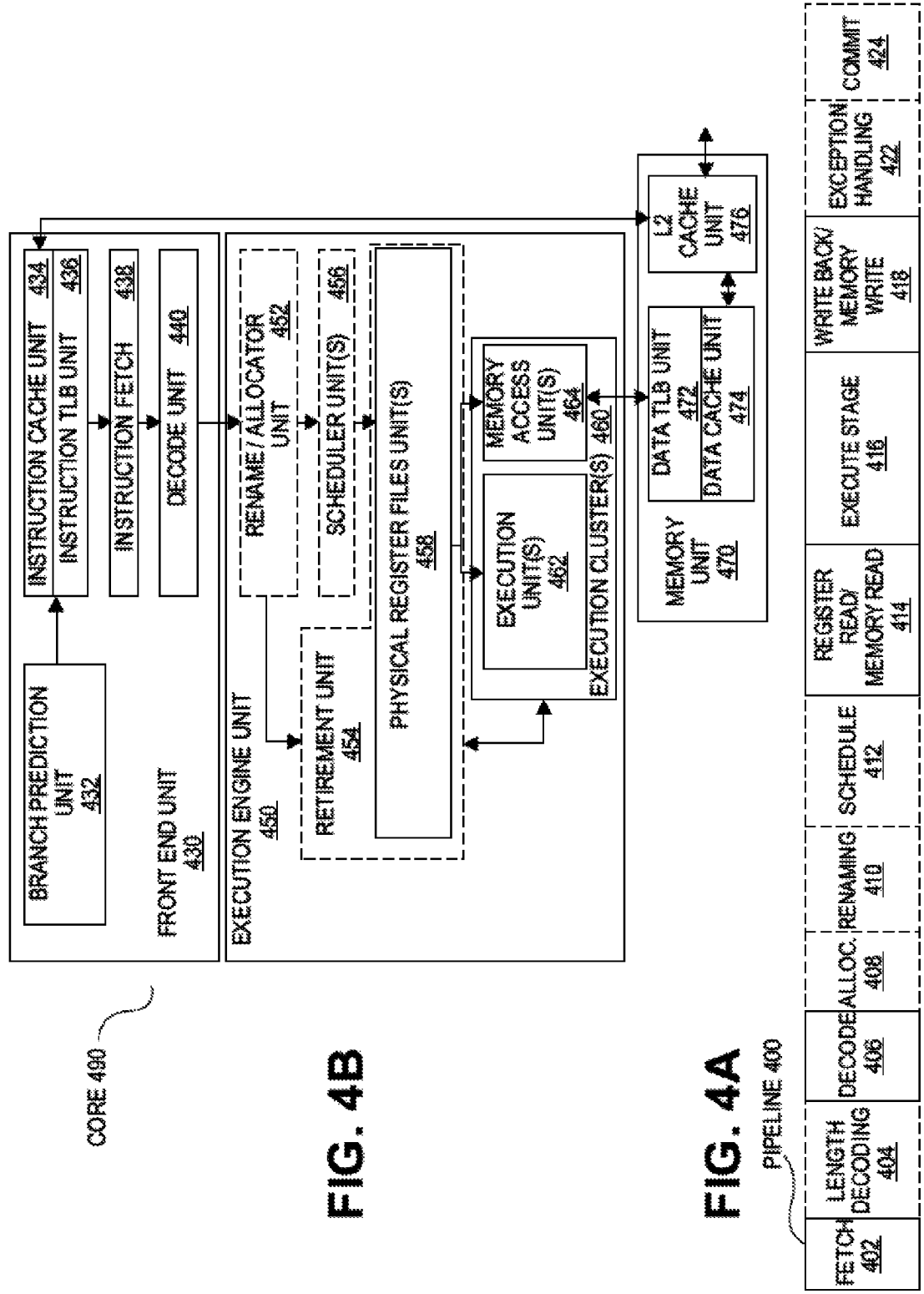
FIG. 4A is a block diagram illustrating an in-order pipeline and a register renaming stage, out-of-order issue/execution pipeline, in accordance with embodiments of the present disclosure.
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 454 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 162 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the cache may be external to the core and/or the processor.

Core 490 may be included in a general-purpose processor, such as a Core™ i3, i5, i7, 2 Duo and Quad, Xeon™, Itanium™, XScale™ or StrongARM™ processor, which may be available from Intel Corporation, of Santa Clara, Calif. The processor may be provided from another company, such as ARM Holdings, Ltd, MIPS, or others. The processor may be a special-purpose processor, such as, for example, a network or communication processor, compression engine, graphics processor, co-processor, embedded processor, or the like. The processor may be implemented on one or more chips, and may be a part of and/or may be implemented on one or more substrates using any of a number of process technologies, such as, for example, BiCMOS, CMOS, or NMOS.

Figure 5:
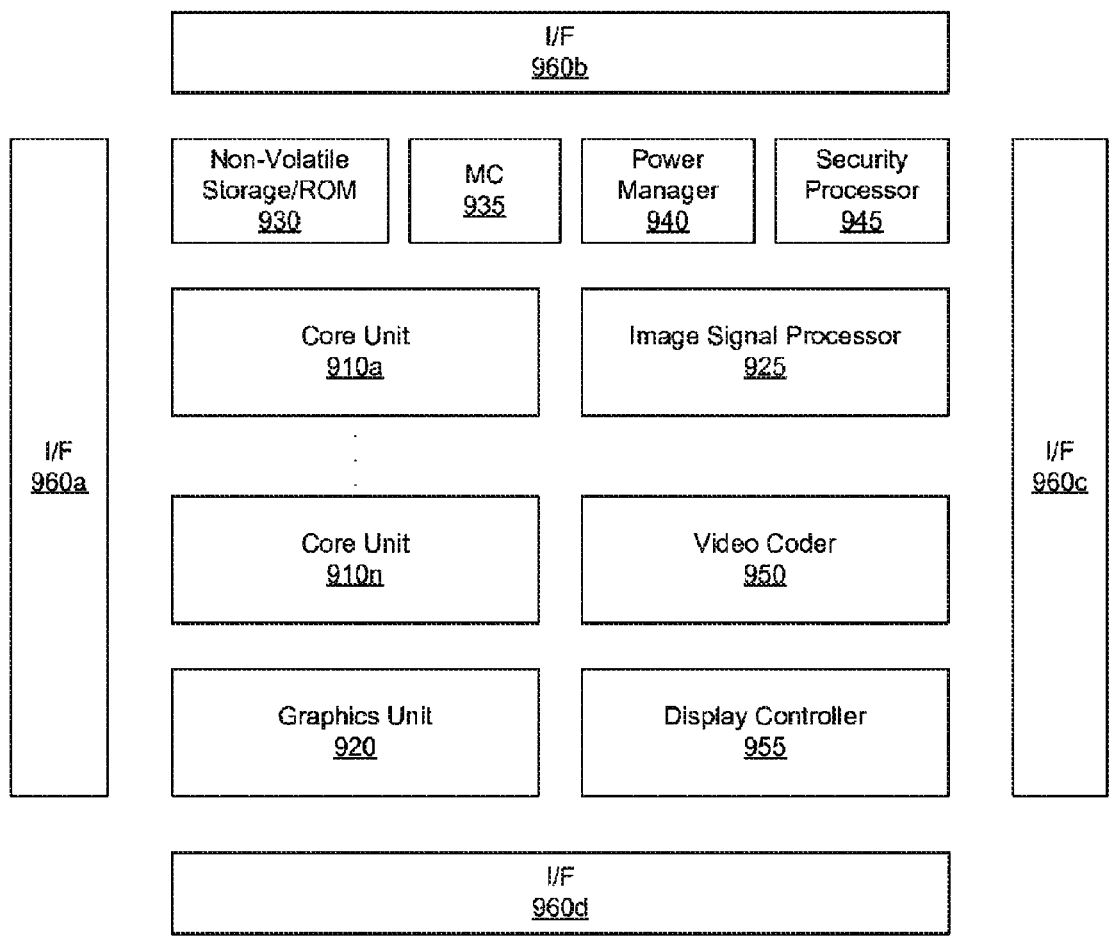
FIG. 5 is a block diagram of a processor in accordance with another embodiment of the present invention.

A processor designed using one or more cores having pipelines as described above may be implemented in many different end products, extending from embedded devices, Internet of Things (IoT) devices, mobile devices to server systems. Referring now to FIG. 5, shown is a block diagram of a processor in accordance with another embodiment of the present invention. In the embodiment of FIG. 5, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from AMD of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as an embedded system, smartphone, tablet computer, phablet computer, Ultrabook™ computer or other portable computing device, which may incorporate a heterogeneous system architecture having a heterogeneous system architecture-based processor design.

In the high level view shown in FIG. 5, processor 900 includes a plurality of core units 910a-910n. Each core unit may include one or more processor cores, one or more cache memories and other circuitry. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth, including the autonomous self-testing test patches described herein.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 5).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 5, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth. Each of the units may have its power consumption controlled via a power manager 940.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 5, understand the scope of the present invention is not limited in this regard.

Figure 6:
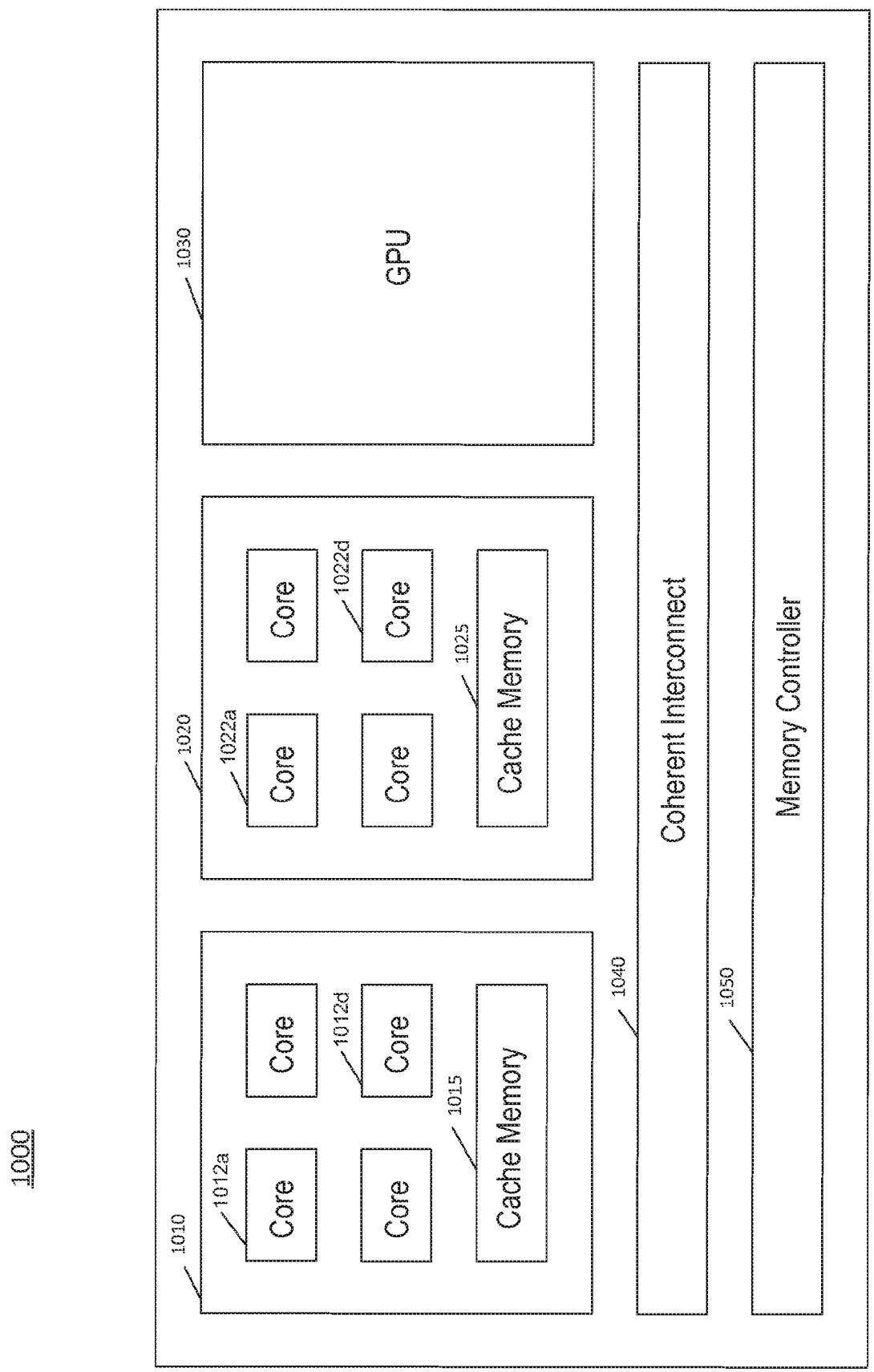
FIG. 6 is a block diagram of another example SoC in accordance with an embodiment of the present invention.

Referring now to FIG. 6, shown is a block diagram of another example SoC. In the embodiment of FIG. 6, SoC 1100 may include various circuitry to enable high performance for multimedia applications, communications and other functions. As such, SoC 1100 is suitable for incorporation into a wide variety of embedded, portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores, and may be configured to perform the autonomous self-testing described herein.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 6, many variations and alternatives are possible.

Figure 7:
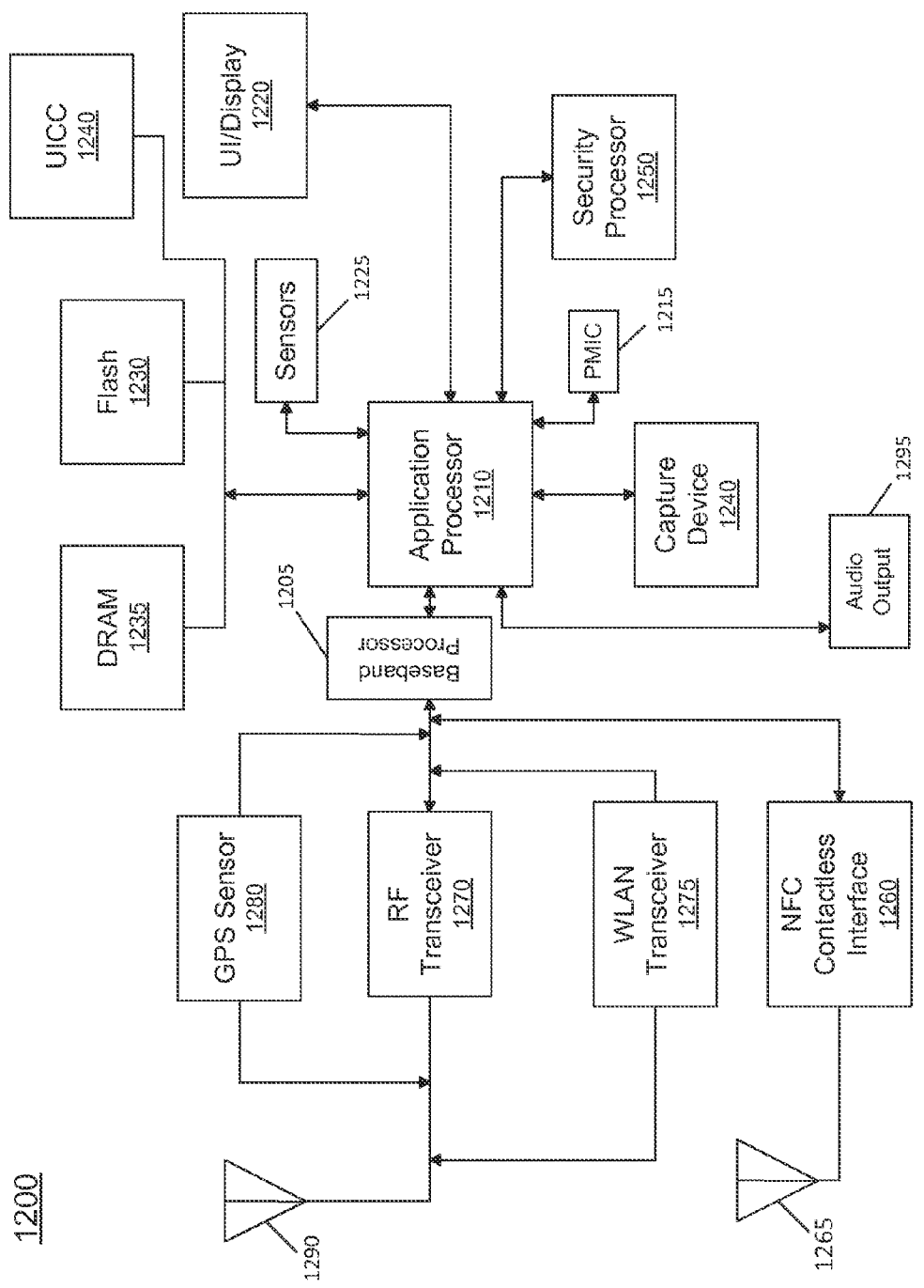
FIG. 7 is a block diagram of an example system with which embodiments can be used.

Referring now to FIG. 7, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software including the microcode-based autonomous self-testing described herein, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 7, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 7, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 8:
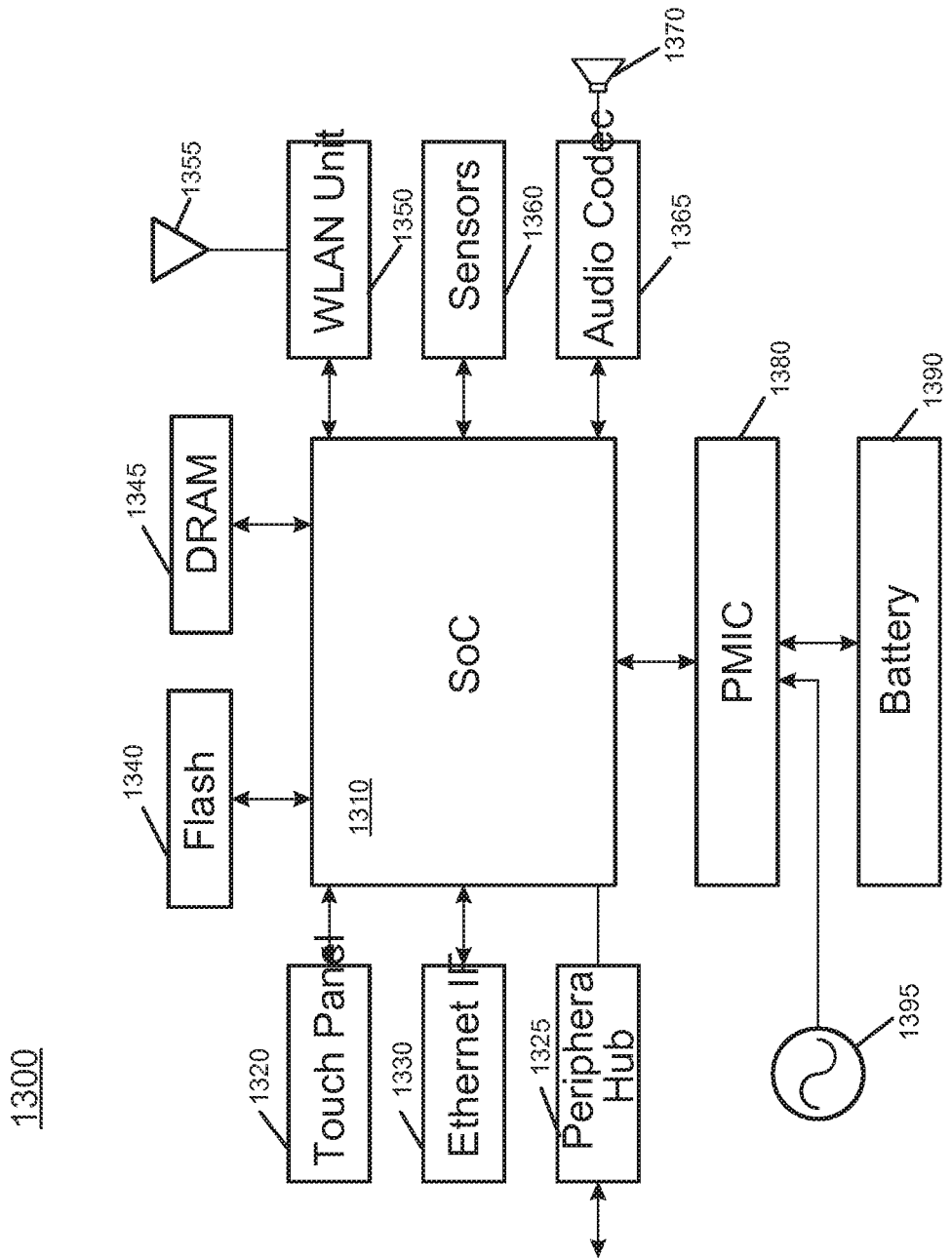
FIG. 8 is a block diagram of another example system with which embodiments may be used.

Referring now to FIG. 8, shown is a block diagram of another example system with which embodiments may be used. In the illustration of FIG. 8, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 8, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 8, many variations and alternatives are possible.

Figure 9:
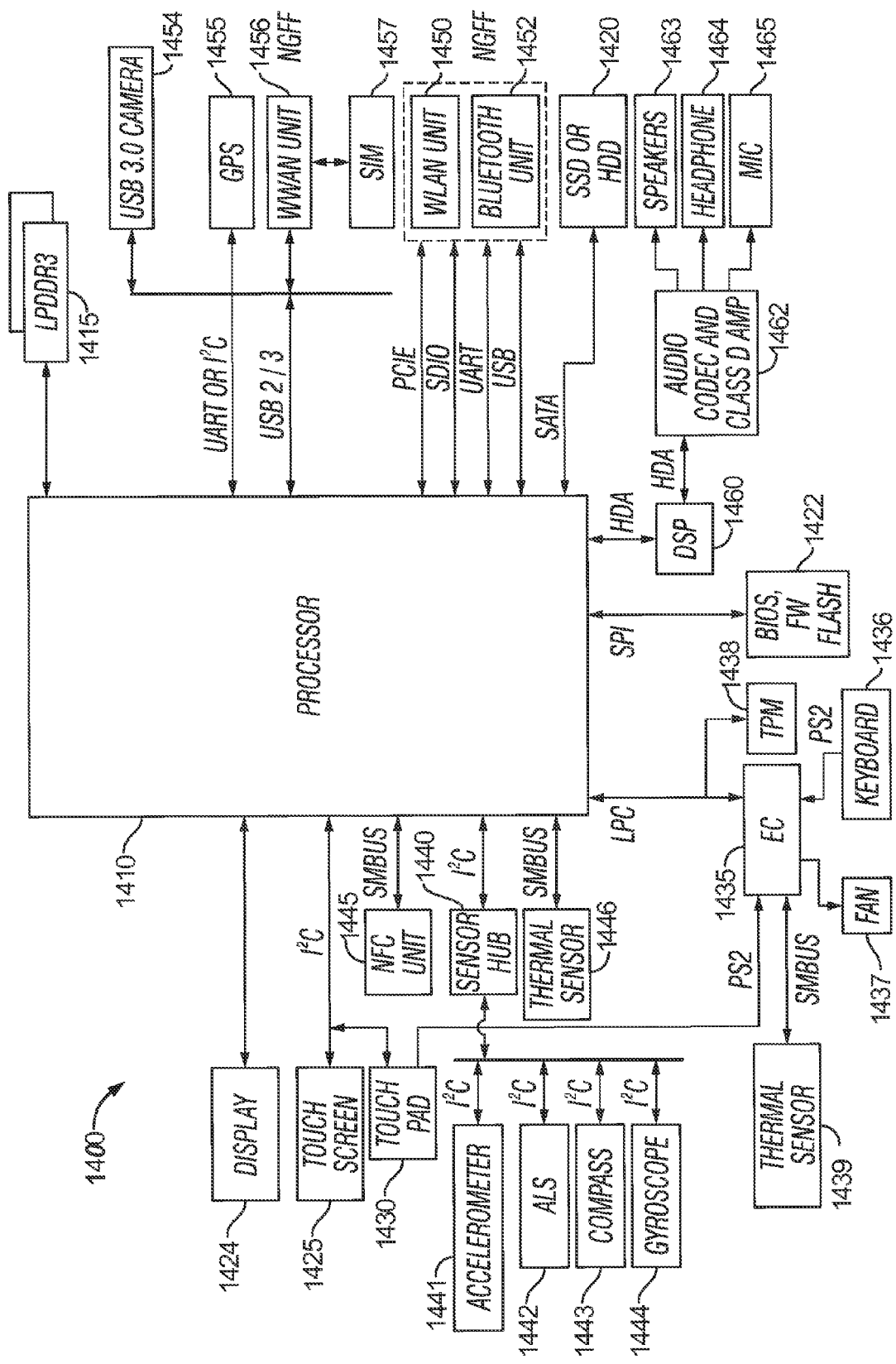
FIG. 9 is a block diagram of a representative computer system.

Referring now to FIG. 9, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1410 is implemented as a SoC, which may be configured to perform the autonomous self-testing described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 9, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 9 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 9, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 9, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 9, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 9, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 9, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 9, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 9, understand the scope of the present invention is not limited in this regard.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 10:
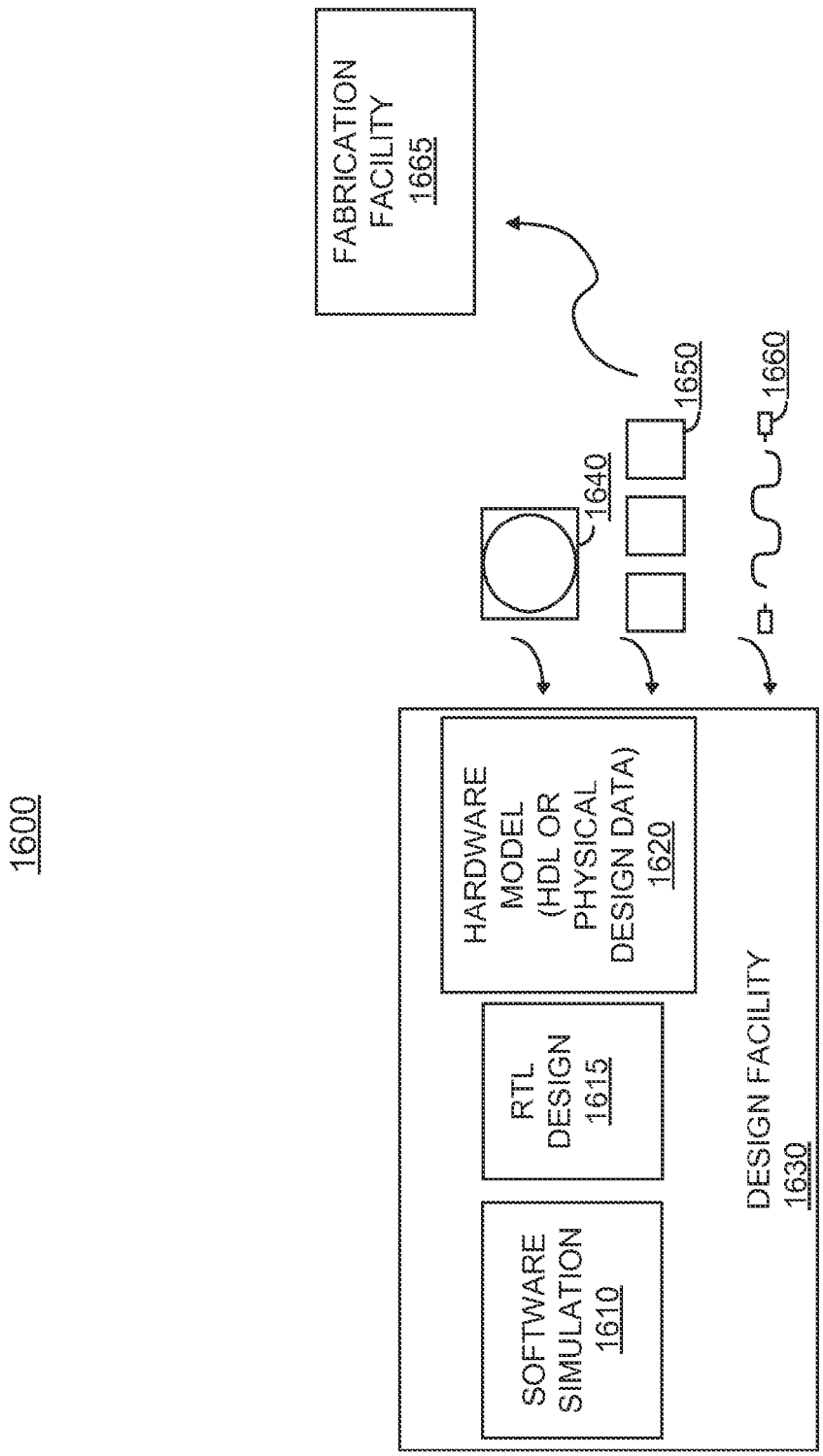
FIG. 10 is a block diagram illustrating an IP core development system used to manufacture an integrated circuit to perform operations according to an embodiment.

FIG. 10 is a block diagram illustrating an IP core development system 1600 that may be used to manufacture an integrated circuit to perform operations according to an embodiment. The IP core development system 1600 may be used to generate modular, reusable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model 1600. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

The following examples pertain to further embodiments.

In one example, a SoC or other processor comprises: at least one core; a power management unit coupled to the at least one core, the power management unit including a first test register having a first field to store an autonomous test patch identifier associated with a test patch and a second field to store a test mode indicator to request a core functionality test; and a microcode storage to store microcode to be executed by the at least one core, where the microcode is, responsive to the test patch identifier, to access a firmware interface table and obtain the test patch from a non-volatile storage according to an address obtained from the firmware interface table.

In an example, the at least one core is to store a result of the test patch in a second test register of the SoC.

In an example, the SoC of one or more of the above examples further includes a manageability engine coupled to the power management unit, the manageability engine to access the result from the second test register and send the result to a requester.

In an example, the manageability engine is to set a run indicator of the first test register after at least one secret is cleared from a storage of the SoC.

In an example, the microcode to be executed by the at least one core is to cause the at least one core to execute the test patch responsive to the set run indicator.

In an example, the manageability engine is to cause the power management unit to update a frequency and a voltage of the at least one core and thereafter enable the core functionality test to be performed.

In an example, the microcode is to update a first field of the second test register with an identifier of at least one core that failed the first array test and update a count field with a count of one or more cores that passed a plurality of array tests and update a count field with a count of one or more cores that failed at least one of the plurality of array tests.

Note that the above SoC can be implemented using various means.

In an example, the SoC comprises an embedded processor to be incorporated in a larger system.

In another example, a system comprises a display and a memory, and includes the processor of one or more of the above examples.

In another example, a method comprises: reading a first test register of a processor; responsive to a first patch identifier of a test patch field of the first test register, selecting a first test patch stored in a firmware storage for execution; reading a run indicator of a run field of the first test register; and responsive to the run indicator being of a first state, executing the first test patch and reporting a result of the first test patch in a second test register of the processor.

In an example, the method further comprises clearing one or more secrets stored in a secure storage of the processor, and thereafter setting a safe mode indicator of the second test register.

In an example, the method further comprises generating a poison cycle to prevent a secure pre-boot launch and thereafter setting the safe mode indicator of the second test register.

In an example, the method further comprises setting the run indicator, via a manageability engine of the processor, responsive to the set safe mode indicator of the second test register.

In an example, the method further comprises storing the first patch identifier in the test patch field of the first test register, via the manageability engine of the processor.

In an example, the method further comprises accessing a firmware interface table using the first patch identifier to obtain an address for the first test patch in the firmware storage.

In an example, the method further comprises reading the first test register responsive to a self-test indicator stored in a fuse storage of the processor.

In an example, the method further comprises: executing a first test patch in a plurality of cores of the processor; updating a first count stored in a first count field of the second test register for each of the plurality of cores that passes the first test patch; updating a second count stored in a second count field of the second test register for each of the plurality of cores that fails the first test patch; and reading, via the manageability engine, the second test register and providing test result information therefrom to a requester.

In an example, the method further comprises storing an identifier of a first core of the plurality of cores that failed the first test patch in a core identification field of the second test register.

In an example, the method further comprises, responsive to a functional test mode indicator of the first test register being of a first state, executing a functional test of one or more of a plurality of cores of the processor at a plurality of voltage and frequency combinations.

In an example, the method further comprises responsive to a second patch identifier of the test patch field of the first test register being a first value, causing a first core of the plurality of cores to enter an infinite loop, to enable a manageability engine of the processor to perform an autonomous self-test of an uncore portion of the processor.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a processor having a plurality of cores, a first interface to couple to a non-volatile storage, and a power management unit to independently control a voltage and a frequency of the plurality of cores, the power management unit to provide access to a first test register having a first field to store an autonomous test patch identifier associated with a test patch stored in the non-volatile storage, a second field to store a test mode indicator to request a core functionality test, and a third field to store a ready indicator to indicate that an autonomous self-test of the test patch is ready to begin, and a second test register having a first field to indicate that the processor is in a safe mode, a second field to indicate a number of the plurality of cores that passed the autonomous self-test and a third field to indicate a number of the plurality of cores that failed the autonomous self-test. The system may further comprise the non-volatile storage coupled to the processor, the non-volatile storage to store a plurality of test patches and a firmware interface table having a plurality of entries to identify locations of the plurality of test patches, where a first core is, responsive to the test patch identifier, to access the firmware interface table and obtain the test patch from a location of the non-volatile storage identified by the firmware interface table.

In an example, the processor further comprises a manageability engine coupled to the power management unit, the manageability engine to access test result information from the second field and the third field of the second test register and send at least some of the test result information to a second system coupled to the system, where the system comprises an embedded system.

In an example, the autonomous self-test comprises one or more diagnostic tests to determine reliability of the processor.

In an example, the processor is to perform the one or more diagnostic tests at a plurality of frequency and voltage levels, to determine an error prediction level associated with the processor, where if the error prediction level is in variance with a threshold level, the processor is to communicate an error prediction report to the second system, to enable the second system to report error prediction information to a remote entity.

In an example, the first field of the second test register is to be set to indicate that the processor is in the safe mode after one or more secrets have been cleared from the processor, where the processor is to execute the autonomous self-test after the first field of the second test register is set.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system-on-chip (SoC) comprising:
at least one core;
a power management unit coupled to the at least one core, the power management unit including a first test register having a first field to store a test patch identifier associated with a test patch and a second field to store a test mode indicator to request a core functionality test; and
a microcode storage to store microcode to be executed by the at least one core, wherein the microcode is, responsive to the test patch identifier, to access a firmware interface table and obtain the test patch from a non-volatile storage according to an address obtained from the firmware interface table.

2. The SoC of claim 1, wherein the at least one core is to store a result of the test patch in a second test register of the SoC.

3. The SoC of claim 2, further comprising a manageability engine coupled to the power management unit, the manageability engine to access the result from the second test register and send the result to a requester.

4. The SoC of claim 3, wherein the manageability engine is to set a run indicator of the first test register after at least one secret is cleared from a storage of the SoC.

5. The SoC of claim 4, wherein the microcode to be executed by the at least one core is to cause the at least one core to execute the test patch responsive to the set run indicator.

6. The SoC of claim 3, wherein the manageability engine is to cause the power management unit to update a frequency and a voltage of the at least one core and thereafter enable the core functionality test to be performed.

7. The SoC of claim 3, wherein the microcode is to update a first field of the second test register with an identifier of at least one core that failed the first array test and update a first count field with a count of one or more cores that passed a plurality of array tests and update a second count field with a count of one or more cores that failed at least one of the plurality of array tests.

8. A machine-readable medium having stored thereon data, which if used by at least one machine, causes the at least one machine to fabricate at least one integrated circuit to perform a method comprising:
reading a first test register of a processor;
responsive to a first patch identifier of a test patch field of the first test register, selecting a first test patch stored in a firmware storage for execution;

reading a run indicator of a run field of the first test register; and responsive to the run indicator being of a first state, executing the first test patch and reporting a result of the first test patch in a second test register of the processor.

9. The machine readable medium of claim 8, wherein the method further comprises clearing one or more secrets stored in a secure storage of the processor, and thereafter setting a safe mode indicator of the second test register.

10. The machine readable medium of claim 9, wherein the method further comprises generating a poison cycle to prevent a secure pre-boot launch and thereafter setting the safe mode indicator of the second test register.

11. The machine readable medium of claim 9, wherein the method further comprises setting the run indicator, via a manageability engine of the processor, responsive to the set safe mode indicator of the second test register.

12. The machine readable medium of claim 11, wherein the method further comprises storing the first patch identifier in the test patch field of the first test register, via the manageability engine of the processor.

13. The machine readable medium of claim 8, wherein the method further comprises accessing a firmware interface table using the first patch identifier to obtain an address for the first test patch in the firmware storage.

14. The machine readable medium of claim 8, wherein the method further comprises reading the first test register responsive to a self-test indicator stored in a fuse storage of the processor.

15. The machine readable medium of claim 8, wherein the method further comprises:

executing the first test patch in a plurality of cores of the processor;

updating a first count stored in a first count field of the second test register for each of the plurality of cores that passes the first test patch;

updating a second count stored in a second count field of the second test register for each of the plurality of cores that fails the first test patch; and reading, via a manageability engine, the second test register and providing test result information therefrom to a requester.

16. The machine readable medium of claim 15, wherein the method further comprises storing an identifier of a first core of the plurality of cores that failed the first test patch in a core identification field of the second test register.

17. The machine readable medium of claim 8, wherein the method further comprises, responsive to a functional test mode indicator of the first test register being of a first state, executing a functional test of one or more of a plurality of cores of the processor at a plurality of voltage and frequency combinations.

18. The machine readable medium of claim 15, wherein the method further comprises responsive to a second patch identifier of the test patch field of the first test register being a first value, causing a first core of the plurality of cores to enter an infinite loop, to enable a manageability engine of the processor to perform an autonomous self-test of an uncore portion of the processor.

19. A system comprising:

a processor having a plurality of cores, a first interface to couple to a non-volatile storage, and a power management unit to independently control a voltage and a frequency of the plurality of cores, the power management unit to provide access to a first test register having a first field to store a test patch identifier associated with a test patch stored in the non-volatile storage, a second field to store a test mode indicator to request a core functionality test, and a third field to store a ready indicator to indicate that an autonomous self-test of the test patch is ready to begin, and a second test register having a first field to indicate that the processor is in a safe mode, a second field to indicate a number of the plurality of cores that passed the autonomous self-test and a third field to indicate a number of the plurality of cores that failed the autonomous self-test; and the non-volatile storage coupled to the processor, the non-volatile storage to store a plurality of test patches and a firmware interface table having a plurality of entries to identify locations of the plurality of test patches, wherein a first core is, responsive to the test patch identifier, to access the firmware interface table and obtain the test patch from a location of the non-volatile storage identified by the firmware interface table.

20. The system of claim 19, wherein the processor further comprises a manageability engine coupled to the power management unit, the manageability engine to access test result information from the second field and the third field of the second test register and send at least some of the test result information to a second system coupled to the system, wherein the system comprises an embedded system.

21. The system of claim 19, wherein the autonomous self-test comprises one or more diagnostic tests to determine reliability of the processor.

22. The system of claim 21, wherein the processor is to perform the one or more diagnostic tests at a plurality of frequency and voltage levels, to determine an error prediction level associated with the processor, wherein if the error prediction level is in variance with a threshold level, the processor is to communicate an error prediction report to the second system, to enable the second system to report error prediction information to a remote entity.

23. The system of claim 19, wherein the first field of the second test register is to be set to indicate that the processor is in the safe mode after one or more secrets have been cleared from the processor, wherein the processor is to execute the autonomous self-test after the first field of the second test register is set.

* * * * *